J. HUBLER.
SCUTCHING MACHINE.
APPLICATION FILED JUNE 2, 1917.

1,268,975.

Patented June 11, 1918.
3 SHEETS—SHEET 1.

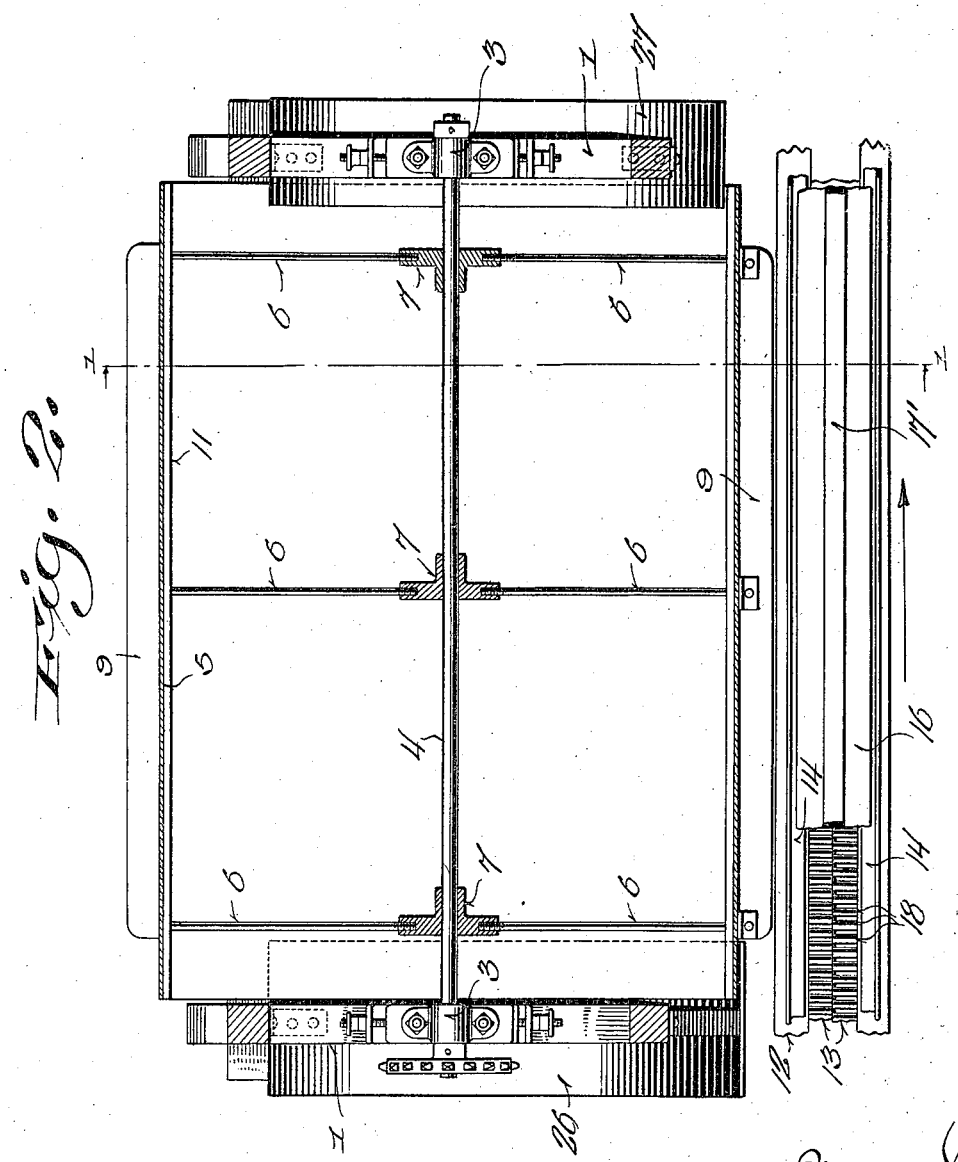

J. HUBLER.
SCUTCHING MACHINE.
APPLICATION FILED JUNE 2, 1917.
1,268,975.
Patented June 11, 1918.
3 SHEETS—SHEET 3.
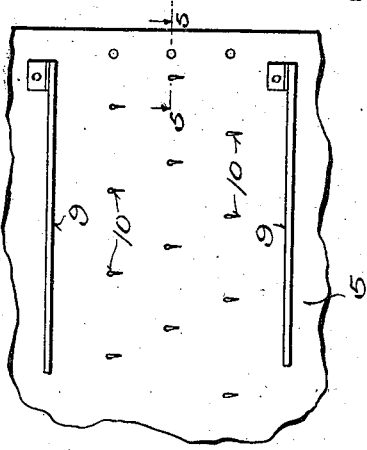
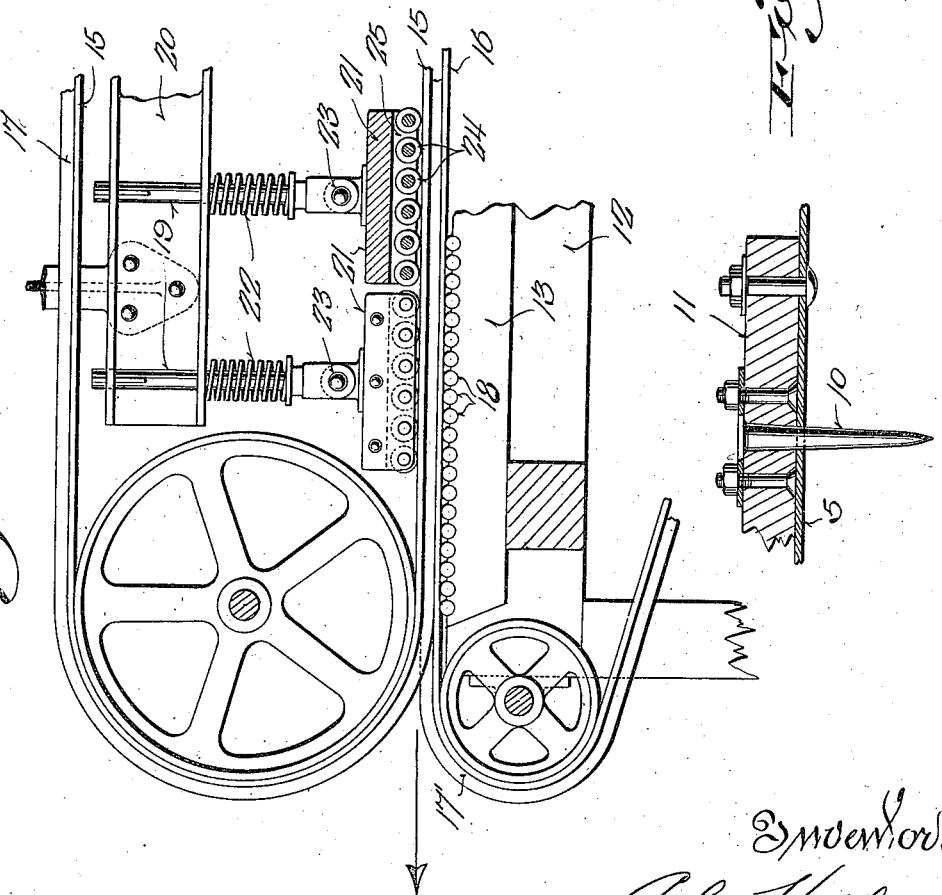

UNITED STATES PATENT OFFICE.

JOHN HUBLER, OF BRANDON, WISCONSIN.

SCUTCHING-MACHINE.

1,268,975.                Specification of Letters Patent.    Patented June 11, 1918.

Application filed June 2, 1917. Serial No. 172,393.

*To all whom it may concern:*

Be it known that I, JOHN HUBLER, a citizen of the United States, and resident of Brandon, in the county of Fond du Lac and State of Wisconsin, have invented certain new and useful Improvements in Scutching-Machines; and I do hereby declare that the following is a full, clear, and exact description thereof.

My present invention consists in new and useful improvements in scutching machines for treating hemp and analogous fiber, the same being an improvement over the structure illustrated in my U. S. patent application Serial No. 137,610, filed Dec. 18, 1916.

This invention like that shown in said application comprises one or more scutching drums for acting upon the hemp as it is caused to travel transversely of the direction of rotation of said drums in a suitable gripping throat, such action on the part of the drums removing the "hurds" and "tow" from the line fiber.

In the previously mentioned patent application and in patents already granted, one of the main disadvantages lies in the fact that no means are provided for preventing the hemp from becoming entangled in the ends of the scutching drums as it is being fed to said drums or conveyed out of engagement with the beater portions thereof. The revolving motion of the drums whips the free ends of the hemp about the drum shafts and bearings thereof.

It is therefore primarily the object of the present invention to provide means for preventing and overcoming this tendency of the hemp to wrap itself about the drum shafts and becoming entangled in the ends of said drums.

It is more specifically an object of this invention to provide an improved arrangement for overcoming friction between the two endless belts which form the gripping throat and the members which hold the inner stretches of the same in operative relation.

Still another object is to provide means whereby a plurality of comb teeth may be simultaneously installed in the drums, such teeth being readily attachable to the wall of the drum, as a unit, whereby it is unnecessary to discontinue the operation of the scutching machine for any considerable length of time.

With the above objects and advantages in view the invention consists in the novel arrangement of parts and form of construction which will be hereinafter more particularly described and claimed and shown in the drawings wherein:

Fig. 2 is a horizontal section on the plane of the line 2—2 of Fig. 1.

Fig. 3 is a detail view on an enlarged scale as seen on the plane of the line 3—3 of Fig. 1.

Fig. 4 is a fragmentary elevational view of a portion of one of the scutching drums viewed from its outer surface, and Fig. 5 is a detail sectional view on the line 5—5 of Fig. 4.

Figure 1:
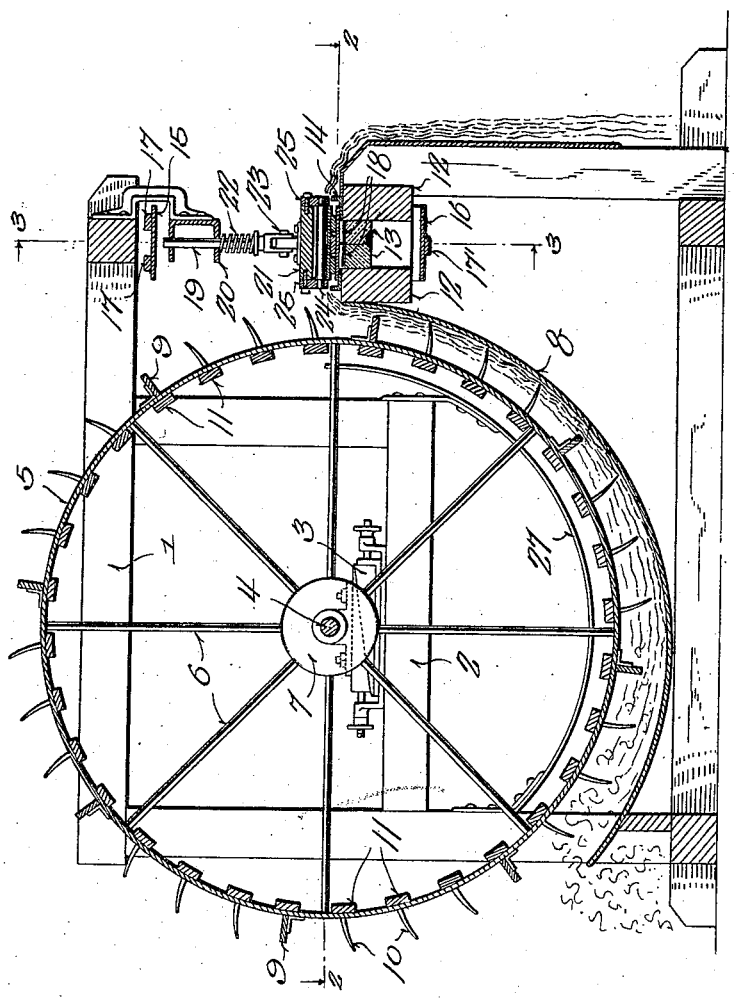
Figure 1 represents a vertical transverse sectional view through a scutching machine constructed in accordance with this invention, said section being taken upon the plane of the line 1—1 of Fig. 2.

In the accompanying drawings only one of the scutching drums 1 and a portion of one of the throat sections is illustrated, but it is obvious that the improvements which constitute the present application could be very well used on the arrangement of scutching drums and throat sections shown in both my U. S. Patent #1,200,615, and in the pending application above referred to.

Referring particularly to the several figures in the drawings it will be seen that the numeral 1 designates suitable end frames upon one of the cross beams 2 on which are disposed adjustable bearings 3 to receive the opposite ends of a scutching drum shaft 4, upon which a scutching drum 5 is mounted. This drum is held in spaced relation with the shaft and caused to rotate therewith by a plurality of spokes or the like 6 which extend radially from hubs 7 fixed to the latter. As in the other machines referred to the drum is substantially cylindrical, of appropriate diameter and length and is adapted to coöperate with an arcuate apron 8 which is disposed therebeneath.

For acting upon the hemp fibers which are fed to the scutching drum by means to be presently described, the same is provided with a plurality of longitudinally disposed spaced rigid beater blades 9 which are secured to the outer surface of the drum, and a plurality of longitudinally arranged series of rigid teeth 10, both of which coact to beat and comb said hemp fiber. The blades 9 are secured upon the drum in any preferred manner, but the series of teeth are preferably arranged to permit them to be readily removed for substituting new series or for any other purpose. Each of the series of teeth is secured to a bar 11, said bars being disposed in engagement with the inner surface of the drum as shown in Fig. 1, and the teeth project through openings in the wall of said drum provided therefor, as in Fig. 5. This figure also shows the preferred manner of securing each tooth to its bar and in turn connecting the ends of the bars to the drum. From Fig. 4 it will be noted that the teeth of the several series are disposed in staggered relation, and that three series are positioned between each pair of beater blades 9.

The supporting means for the previously described throat section consists of a pair of spaced side sills 12 which extend longitudinally of the machine, a pair of bearing beams 13 disposed between said sills, and a pair of track rails 14, the same resting upon said sills 12 and having upwardly extending spaced flanges as shown in my pending patent application. The throat section consists broadly of a pair of endless belts 15 and 16 upon the outer surfaces of which are coacting inter-engaging ribs 17 and 17', the ribs 17 being carried by the upper belt 15 and the single rib 17' by the lower belt 16. On the inner stretches of the belts the rib 17' is positioned between the pair of ribs 17 to tightly hold the hemp fibers while being acted upon by the drums.

The lower belt 16 has its inner stretch engageable with the tracks 14 and to overcome friction between these engaging members a plurality of cold-rolled steel rollers are mounted in semi-circular bearings in the form of transverse grooves cut in the top of the beams 13. Heretofore it has been necessary to frequently oil the rollers or other members used for overcoming friction between the inner stretch of the lower belt and its support; thus causing a considerable amount of expense and labor, the machine being idle while such operation was being undertaken.

I have discovered by many experiments that the provision of beams 13 formed from a specially treated hardwood and the positioning of steel rollers in seats or bearings formed therein, that considerable amount of friction is overcome and no oiling or lubricating of any sort is necessary. As shown in Figs. 1 and 2, two sets of the steel rollers 18 are provided, one being disposed in each of the beams 13 and the individual rollers forming one set are disposed in staggered relation with those of the other set.

The inner stretch of the upper belt 15 is held in engagement with the inner stretch of the other belt in a manner somewhat similar to that shown in the application hereinbefore referred to, the same consisting of a plurality of upright plunger rods 19 mounted to reciprocate in a channeled bar 20 which extends longitudinally of the machine over the sills 12. The lower ends of the plungers are provided with heads 21 which are caused to move downwardly toward the inner stretch of the belts by expansion springs 22. Said heads are each pivoted to one of the plunger rods as at 22.

Each head 21 carries a plurality of transversely disposed rollers 24 for contacting with the belt 15. The rollers have their opposite ends cylindrically reduced and disposed in bearings formed in hard wood plates 25 which are secured to the opposite sides of the heads 21. These plates 25 are specially treated in the same manner as the beams 13 and it is unnecessary to lubricate the rollers 24 and their bearings to overcome friction. By this arrangement the hemp fibers are securely held between the inner stretches of the belts and the latter are permitted to move with a minimum amount of friction.

As hereinbefore pointed out, the hemp fiber, in machines of ordinary construction while being fed to or from the scutching drums, is liable to become entangled in the ends of the drums or to be wound around the shafts thereof. The arrangement shown most clearly in Fig. 2 has been designed to effectively overcome this defect of ordinary scutching machines. It consists in positioning an arcuate guard at each end of the drum which extends from a point slightly above the plane of the inner stretch of the belts downwardly to approximately the end of the apron 8. At the inner end of the drum a relatively wide guard 26 is disposed, said guard extending a considerable distance beyond the bearings 3 and the end of the drum shaft 4. The other edge of the guard overlaps the inner end of the drum and is disposed externally thereof. The guard 27 at the opposite end of the drum is somewhat less in width and is disposed internally of the end of said drum. By this simple arrangement of stationary guards, hemp fibers are properly acted upon by the drum without danger of their being entangled with the ends thereof. Any desired arrangement may be employed for holding the guards in stationary position relative to the drum, but are preferably fixed to the end frames 1 as shown in Figs. 1 and 2.

From the foregoing description taken in connection with the accompanying drawings it is evident that the combination of parts enumerated and described produces an extremely efficient scutching machine which is considerably simpler than similar machines now on the market. The operation of the same will necessarily be much more efficient than such machines because of the great improvement in the arrangement of parts.

I claim:

1. In a scutching machine of the class described, a gripping and conveying mechanism including upper and lower endless belts, a support for the inner stretch of one of the belts, said support comprising a beam provided with a plurality of transverse bearing seats, a second beam also having a plurality of transverse bearing seats, the seats of one beam being in staggered relation with those of the other, a cylindrical roller disposed in each of said seats to be engaged by the inner stretch of one of said belts, and means engageable with the inner stretch of the other belt to hold the same together and in engagement with said rollers.

2. In a scutching machine of the class described, a gripping and conveying mechanism including upper and lower endless belts, a support for the inner stretch of one of the belts, means engageable with the inner stretch of the other belt to hold the same together and in contact with said support, said means comprising a plurality of plunger rods, a head pivoted to each of said rods, the pivotal connection between said heads and rods extending transversely of the former, a plurality of rollers revolubly mounted in each of said heads, said rollers extending transversely of the latter and parallel with said pivotal connection, and means for moving said heads toward the inner stretch of the belts.

3. In a scutching machine of the class described, a revoluble hollow scutching drum open at one end, means for feeding work material to said drum, and a stationary guard at the open end of the drum to prevent work material from becoming entangled therein, said guard being disposed partly within said drum and also projecting beyond the end thereof.

4. In a scutching machine of the class described, a revoluble scutching drum, means for feeding work material to said drum, a stationary arcuate guard at the inner end of the drum, said guard being disposed externally of the drum, and a similar stationary guard at the opposite end of the drum, said guard being positioned internally of the drum.

In testimony that I claim the foregoing I have hereunto set my hand at Brandon, in the county of Fond du Lac and State of Wisconsin.

JOHN HUBLER.